United States Patent
Anchi et al.

(10) Patent No.: US 11,620,240 B2
(45) Date of Patent: Apr. 4, 2023

(54) PERFORMANCE-DRIVEN ACCESS PROTOCOL SWITCHING FOR A LOGICAL STORAGE DEVICE

(71) Applicant: EMC IP Holding Company LLC, Hopkinton, MA (US)

(72) Inventors: Amit Pundalik Anchi, Bangalore (IN); Vinay G. Rao, Bangalore (IN); Sanjib Mallick, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/113,184

(22) Filed: Dec. 7, 2020

(65) Prior Publication Data
US 2022/0179804 A1    Jun. 9, 2022

(51) Int. Cl.
*G06F 13/16*    (2006.01)
*G06F 11/34*    (2006.01)
(Continued)

(52) U.S. Cl.
CPC ...... *G06F 13/1668* (2013.01); *G06F 11/3027* (2013.01); *G06F 11/349* (2013.01); *G06F 13/4221* (2013.01)

(58) Field of Classification Search
CPC ............. G06F 13/1668; G06F 13/4221; G06F 11/3027; G06F 11/349
See application file for complete search history.

(56) References Cited

U.S. PATENT DOCUMENTS

| 6,567,397 B1 | 5/2003 | Campana et al. |
| 6,687,746 B1 | 2/2004 | Shuster et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Nimesh G Patel
(74) *Attorney, Agent, or Firm* — Ryan, Mason & Lewis, LLP

(57) ABSTRACT

An apparatus in one embodiment includes at least one processing device, with the at least one processing device comprising a processor and a memory coupled to the processor. The at least one processing device is configured to monitor performance of respective ones of a plurality of paths for accessing a logical storage device, and responsive to detection of at least one specified condition in the monitored performance relating to at least a subset of the paths, to switch the logical storage device from utilization of a first access protocol to utilization of a second access protocol different than the first access protocol. For example, in some embodiments, the at least one processing device is configured to switch the logical storage device from a SCSI access protocol to an NVMe access protocol, and vice versa, responsive to congestion, errors or other detected performance conditions currently impacting one of the access protocols.

21 Claims, 4 Drawing Sheets

(51) Int. Cl.
    *G06F 11/30*      (2006.01)
    *G06F 13/42*      (2006.01)

(56) References Cited

U.S. PATENT DOCUMENTS

| | | |
|---|---|---|
| 6,697,875 B1 | 2/2004 | Wilson |
| 7,275,103 B1 * | 9/2007 | Thrasher .......... H04L 45/22 709/239 |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0028163 A1 * | 1/2008 | Woods .......... G06F 3/067 711/154 |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2015/0301970 A1 * | 10/2015 | Armstead .......... G06F 9/54 710/105 |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0045109 A1 * | 2/2020 | Hegde .......... H04L 41/20 |
| 2020/0097203 A1 * | 3/2020 | Mallick .......... G06F 3/0634 |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit Pundalik Anchi et al. filed Dec. 11, 2019, and entitled "Automated Seamless Migration with Signature Issue Resolution."

U.S. Appl. No. 16/599,235 filed in the name of Sanjib Mallick et al. filed Oct. 11, 2019, and entitled "Host Device with Multi-Path Layer Providing Dynamic Control of One or More Path Selection Algorithms."

U.S. Appl. No. 17/106,788 filed in the name of Amit Pundalik Anchi et al. filed Nov. 30, 2020, and entitled "Automated Seamless Migration Across Access Protocols for a Logical Storage Device."

U.S. Appl. No. 16/797,671 filed in the name of Vinay G. Rao et al. filed Feb. 21, 2020, and entitled "Host Device with Efficient Automated Seamless Migration of Logical Storage Devices Across Multiple Access Protocols."

(56) References Cited

OTHER PUBLICATIONS

U.S. Appl. No. 16/793,262 filed in the name of Amit Pundalik Anchi et al. filed Feb. 18, 2020, and entitled "Non-Disruptive Transformation of a Logical Storage Device from a First Access Protocol to a Second Access Protocol."

* cited by examiner

PERFORMANCE-DRIVEN ACCESS PROTOCOL SWITCHING FOR A LOGICAL STORAGE DEVICE

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (TO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols. However, a given host device will typically be configured to utilize only one access protocol at a time to access a particular logical storage device, and reconfiguring such a host device to utilize a different access protocol to access that logical storage device can be problematic in some situations. For example, even though a storage system may support multiple access protocols like SCSI and NVMe for its logical storage devices, transforming host device access from SCSI to NVMe using conventional techniques can be problematic. A need therefore exists for improved techniques that can avoid the drawbacks of conventional approaches.

SUMMARY

Illustrative embodiments provide performance-driven access protocol switching for a logical storage device. For example, one or more embodiments can alter the particular access protocol through which a given logical storage volume or other logical storage device is accessed by one or more host devices, illustratively from a particular SCSI access protocol, such as SCSI over Fibre Channel (SCSI-FC), to a particular NVMe access protocol, such as NVMe over Fabrics (NVMeF), or vice versa, based on congestion, errors and/or other detected performance conditions impacting access to that logical storage device using one of the access protocols. It is to be appreciated that a wide variety of other types of storage access protocols can be used in other embodiments.

Some embodiments disclosed herein utilize a multi-path layer of one or more host devices in implementing performance-driven switching between the multiple access protocols, in a manner that provides enhanced access to the logical storage device and therefore improved overall system performance.

In one embodiment, an apparatus comprises at least one processing device comprising a processor and a memory coupled to the processor. The at least one processing device is configured to monitor performance of respective ones of a plurality of paths for accessing a logical storage device, and responsive to detection of at least one specified condition in the monitored performance relating to at least a subset of the paths, to switch the logical storage device from utilization of a first access protocol to utilization of a second access protocol different than the first access protocol.

For example, in some embodiments, the at least one processing device is configured to switch the logical storage device from a SCSI access protocol such as SCSI-FC to an NVMe access protocol such as NVMeF, and vice versa, responsive to congestion, errors or other detected performance conditions currently impacting one or more paths associated with a particular one of the access protocols.

The at least one processing device illustratively comprises at least a portion of at least one host device coupled to at least one storage array or other type of storage system via at least one network.

The paths in some embodiments are associated with respective initiator-target pairs, with each of a plurality of initiators of the initiator-target pairs comprising a corresponding host bus adaptor (HBA) of the at least one host device and each of a plurality of targets of the initiator-target pairs comprising a corresponding port of the storage system.

The at least one host device illustratively comprises a multi-path layer, with the multi-path layer comprising at least one multi-path input-output (MPIO) driver configured to control delivery of IO operations from the at least one host device to the storage system over selected paths through the network.

In some embodiments, monitoring performance of respective ones of a plurality of paths for accessing a logical storage device comprises monitoring performance of a first set of paths associated with the first access protocol, and monitoring performance of a second set of paths associated with the second access protocol.

For example, monitoring performance of at least one of the first and second sets of paths illustratively comprises sending designated access protocol commands over corresponding ones of the paths, measuring response time to the access protocol commands, and repeating the sending and measuring in each of a plurality of monitoring intervals. A wide variety of other types of performance monitoring techniques can be used in other embodiments. As another example, monitoring performance of respective ones of a plurality of paths for accessing a logical storage device illustratively comprises monitoring fabric performance impact notifications received from one or more switch fabrics. Combinations of these and other performance monitoring techniques can be used.

In some embodiments, detecting at least one specified condition in the monitored performance relating to at least a subset of the paths comprises comparing at least one performance measure of the first set of paths associated with the first access protocol to at least one performance measure of the second set of paths associated with the second access protocol, and detecting at least a threshold differential between the performance measures of the first and second sets of paths.

Multiple performance measures may be used in determining whether or not at least a threshold differential exists between different paths associated with different access protocols. For example, different paths associated with different access protocols may have similar response time measures, but host queue length may exhibit more than a threshold differential between the different paths. In such arrangements, determining whether at least a threshold differential exists can include comparing first performance measures for different paths associated with different access protocols, and if the threshold differential is not detected using the first performance measures, one or more additional comparisons may be sequentially implemented using respective additional performance measures, such as host queue length, storage array port congestion, and many others.

The at least one processing device in some embodiments is further configured to dynamically switch the logical storage device between utilization of the first and second access protocols over a plurality of access protocol switching instances responsive to detection of respective specified conditions in the monitored performance of paths associated with one of the access protocols relative to the monitored performance of paths associated with the other one of the access protocols.

Additionally or alternatively, the at least one processing device is further configured to monitor the performance of the paths over a plurality of monitoring intervals and for each of one or more of the monitoring intervals to select a particular one of the first and second access protocols for utilization by the logical storage device in that monitoring interval based at least in part on the monitored performance of the paths for at least one previous one of the monitoring intervals. In some arrangements of this type, selecting a particular one of the first and second access protocols for utilization by the logical storage device in a given one of the monitoring intervals illustratively comprises selecting the particular one of the first and second access protocols having a lowest average response time across its associated paths for at least one previous one of the monitoring intervals. Other access protocol selection techniques based at least in part on monitored performance can be used.

In some embodiments, the at least one processing device is further configured, in conjunction with switching the logical storage device from utilization of the first access protocol to utilization of the second access protocol, or vice versa, to temporarily pause sending of IO operations to the logical storage device, to allow one or more IO operations previously sent to the logical storage device to complete, to switch the logical storage device between access protocols, and to resume sending of IO operations to the logical storage device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
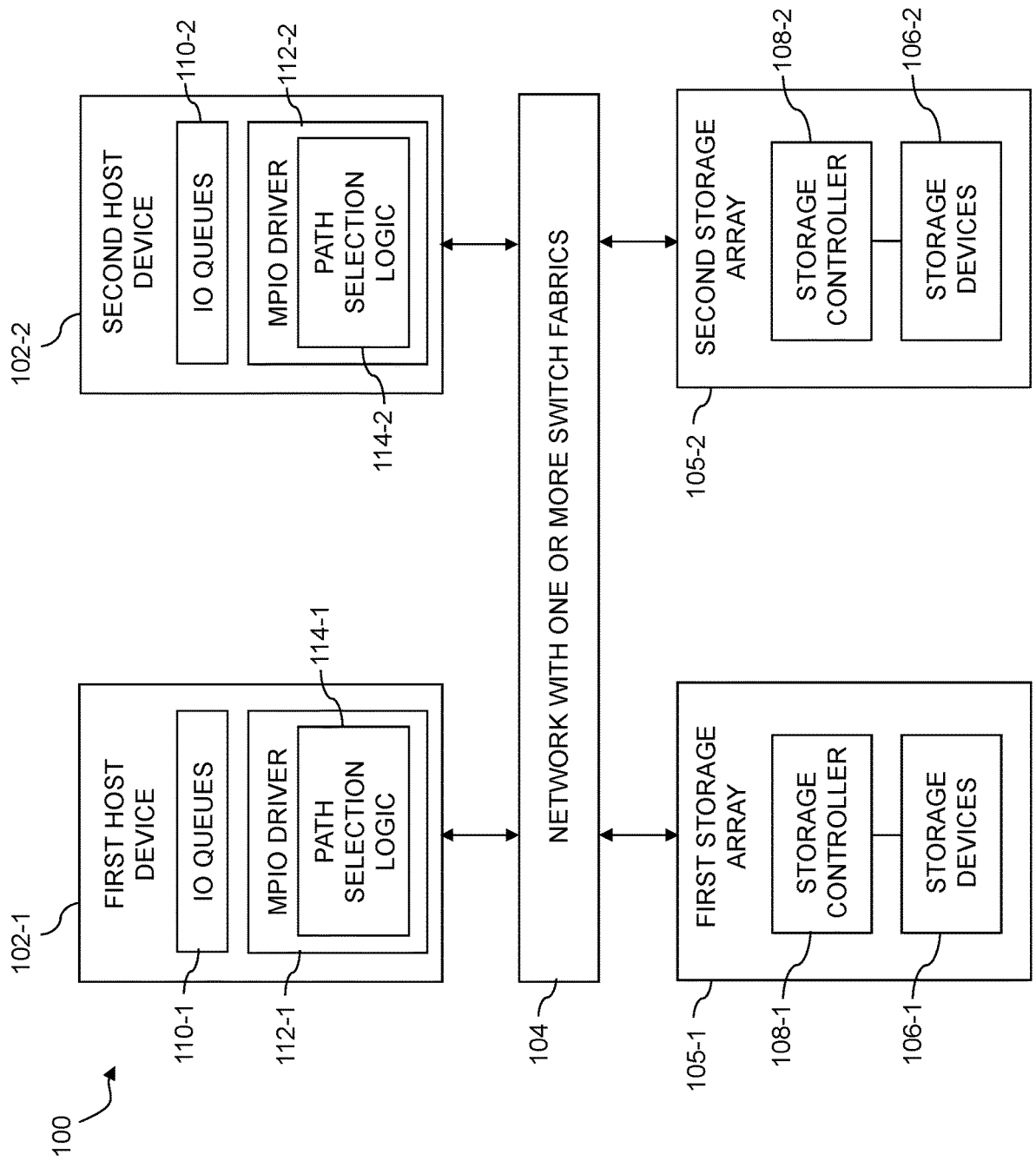
FIG. 1 is a block diagram of an information processing system configured with functionality for performance-driven access protocol switching utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more Unity™ or PowerMax™ storage arrays, commercially available from Dell Technologies. As another example, one or both of the storage arrays 105 may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

Accordingly, in some embodiments, the host devices 102 are configured to support such application movement between those host devices. This application movement can be used as part of an automated seamless migration of a logical storage device between access protocols, although other types of automated seamless migration not involving application movement can be used in other embodiments.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabrics, also referred to as NVMeF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume implemented on one or both of the storage arrays 105 in the system 100 illustratively comprises a set of one or more LUNs or other storage volumes of one or both of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

In some embodiments, the multi-path layer additionally supports what is referred to herein as "performance-driven access protocol switching" for logical storage devices of the storage arrays 105. Such performance-driven access protocol switching functionality may be implemented at least in part in the multi-path layer, and may additionally or alternatively be implemented at least in part in respective migration control logic instances of the host devices 102 and storage arrays 105.

The MPIO drivers 112 may comprise, for example, otherwise conventional MPIO drivers, such as PowerPath® drivers from Dell Technologies, suitably modified in the manner disclosed herein to support performance-driven access protocol switching. Other types of MPIO drivers from other driver vendors may be suitably modified to incorporate functionality for performance-driven access protocol switching as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also configured to implement at least portions of performance-driven access protocol switching functionality of host device 102-1. Other host device components, such as migration control logic implemented in one or more host device processors, can additionally or alternatively implement aspects of the performance-driven access protocol switching functionality of the host device 102-1. The disclosed embodiments are therefore not limited to embodiments in which performance-driven access protocol switching functionality is controlled at least in part by an MPIO driver or multi-path layer.

As indicated previously, migration of logical storage volumes or other logical storage devices across multiple access protocols can be problematic. For example, host-based seamless migration in these and other contexts can be inefficient, consuming significant amounts of computational and network resources of the host device. Such requirements of conventional approaches can negatively impact the seamless migration process and thereby degrade overall system performance.

For example, some conventional host-based migration processes such as PowerPath® Migration Enabler (PPME) typically require that a host administrator and a storage administrator cooperate in setting up and executing the migration process, which in some circumstances can complicate the migration effort.

Storage-based migration processes such as Non-Destructive Migration (NDM) of a source device to a target device do not require such cooperation, but typically require device spoofing. More particularly, these storage-based migration processes typically require the target device to spoof the source device identifier or ID. This spoofing poses problems since the target device ID on the target array in some cases does not reflect the actual storage array on which the device resides. For example, if the storage array information is embedded in the device ID, and the target device is spoofing the source device by using the source device ID, the storage array information embedded in the spoofed device ID will indicate the source array and not the target array, even though the target device is located on the target array.

Host-based migration processes such as the above-noted PPME allow the target device to keep its own device ID, as an MPIO driver of a multi-path layer can merge the two device IDs into a single device ID for presentation to a host device processor layer, thereby avoiding the problems associated with spoofing.

The performance-driven access protocol switching techniques of illustrative embodiments disclosed herein provide significant advantages over these and other conventional approaches.

For example, some embodiments are configured to facilitate migration of a logical storage device from use of a first access protocol such as SCSI-FC to use of second access protocol such as NVMeF, and vice versa, responsive to detected performance conditions currently impacting one of the access protocols, in a particularly efficient manner that intelligently leverages multi-pathing functionality of a given host device environment. Such performance-driven access protocol switching can be implemented across two or more distinct access protocols of numerous other types in other embodiments.

In some embodiments, the migration is illustratively implemented using a process in which one or more hosts previously accessing a logical storage device via a particular one of the access protocols are reconfigured to access the logical storage device via the other one of the access protocols. In some arrangements of this type, it is assumed that the host OS is unable to access the logical storage device using the first and second access protocols simultaneously, and can instead only access the logical storage device using one of the access protocols at any given time. Accordingly, some embodiments herein configure an MPIO layer to determine, for example, that one or more paths associated with one of the access protocols are currently performing significantly better than one or more other paths associated with the other one of the access protocols, and responsive to such a determination, to migrate at least one host from its currently used access protocol for the logical storage device to the other access protocol. Such dynamic switching between access protocols illustratively leverages the MPIO layer to provide performance-driven migration of hosts between utilization of different access protocols for one or more logical storage devices.

Terms such as "migrate" and "migration" as used herein are therefore intended to be broadly construed, so as to encompass, for example, reconfiguring or otherwise transitioning a logical storage device and/or one or more associated host devices from utilization of a first access protocol to utilization of a second access protocol. Alternative access protocol switching arrangements can be used in other embodiments.

In accordance with the performance-driven access protocol switching functionality of illustrative embodiments, an MPIO layer comprising one or more of the MPIO drivers 112-1 and 112-2 of the respective host devices 102-1 and 102-2 is configured to monitor performance of respective ones of a plurality of paths for accessing at least one logical storage device, and responsive to detection of at least one specified condition in the monitored performance relating to at least a subset of the paths, to switch the at least one logical storage device from utilization of a first access protocol to utilization of a second access protocol different than the first access protocol.

Such an MPIO layer illustratively runs on at least one processing device that comprises at least a portion of at least one of the host devices 102 coupled to the storage arrays 105 via the network 104. Other arrangements of one or more processing devices, each comprising at least one processor and at least one memory coupled to the at least one processor, may be used in other embodiments.

As indicated previously, the first and second access protocols illustratively comprise respective SCSI and NVMe access protocols, such as SCSI-FC and NVMeF access protocols, although other arrangements of two or more distinct access protocols can be used in other embodiments.

In some embodiments, the paths are associated with respective initiator-target pairs, with each of a plurality of initiators of the initiator-target pairs comprising an HBA of one of the host devices 102 and each of a plurality of targets of the initiator-target pairs comprising a corresponding port of one of the storage arrays 105.

In some embodiments, monitoring performance of respective ones of a plurality of paths for accessing a logical storage device comprises monitoring performance of a first set of paths associated with the first access protocol, and monitoring performance of a second set of paths associated with the second access protocol.

As a more particular example, monitoring performance of at least one of the first and second sets of paths comprises sending designated access protocol commands over corresponding ones of the paths, measuring response time to the access protocol commands, and repeating the sending and measuring in each of a plurality of monitoring intervals. Numerous other performance monitoring techniques generating other types of metrics or other performance measures can be used in other embodiments. The response times are examples of what are also referred to herein as "latencies" of the respective paths. Again, response times or other types of measured latencies are examples of what are more generally referred to herein as "performance measures" generated as part of the performance monitoring.

In some embodiments, monitoring performance of respective ones of the plurality of paths for accessing the logical storage device comprises monitoring fabric performance impact notifications (FPINs) received from one or more switch fabrics 104. Performance conditions impacting one or more paths as indicated by such FPINs can be used to control switching of the logical storage device between access protocols as disclosed herein.

Detecting at least one specified condition in the monitored performance relating to at least a subset of the paths illustratively comprises comparing at least one performance measure of the first set of paths associated with the first access protocol to at least one performance measure of the second set of paths associated with the second access protocol, and detecting at least a threshold differential between the performance measures of the first and second sets of paths. For example, in the presence of at least a threshold differential, such as at least a threshold percentage difference between performance measures for the respective path sets, one of the first and second access protocols illustratively has a relatively high level of performance, compared to the other one of the first and second access protocols, which has a relatively low level of performance. Illustrative embodiments herein dynamically switch at least one logical storage device from the access protocol currently having the relatively low level of performance to the access protocol currently having the relatively high level of performance.

The response time measurements in some embodiments utilize VU commands that primarily measure SAN performance. Measurements of this type are generally not impacted by storage array port load, but instead reflect switch delays in the SAN. Once again, this is only an example, and numerous other types of performance measures can be used in comparing performance of paths associated with one access protocol to performance of paths associated with another access protocol.

Multiple performance measures may be used in determining whether or not at least a threshold differential exists between paths associated with the first and second protocols. For example, different paths associated with different access protocols may have similar response time measures, but host queue length may exhibit more than a threshold differential between the different paths. In such arrangements, determining whether at least a threshold differential exists can include comparing first performance measures for different paths associated with different access protocols, and if the threshold differential is not detected using the first performance measures, one or more additional comparisons may be sequentially implemented using respective additional performance measures, such as host queue length, storage array port congestion, and many others.

For example, in some embodiments, comparing performance for different paths associated with different access protocols is not based solely on response time, but instead response time is one of multiple performance measures that are used in the comparison. If response time for the different paths associated with the different protocols is substantially the same, the comparison may then move to host queue length, and this continues until either a threshold differential is detected or all comparisons are complete.

In illustrative embodiments, as the monitored performance changes over time, different access protocols are utilized to access the logical storage device at different times, based at least in part on the monitored performance.

Accordingly, at least one of the MPIO drivers 112 of at least one of the host devices 102 is configured to dynamically switch the logical storage device between utilization of the first and second access protocols over a plurality of access protocol switching instances, responsive to detection of respective specified conditions in the monitored performance of paths associated with one of the access protocols relative to the monitored performance of paths associated with the other one of the access protocols.

Additionally or alternatively, at least one of the MPIO drivers 112 of at least one of the host devices 102 is configured to monitor the performance of the paths over a plurality of monitoring intervals and for each of one or more of the monitoring intervals to select a particular one of the first and second access protocols for utilization by the logical storage device in that monitoring interval based at least in part on the monitored performance of the paths for at least one previous one of the monitoring intervals.

In some embodiments, selecting a particular one of the first and second access protocols for utilization by the logical storage device in a given one of the monitoring intervals illustratively comprises selecting the particular one of the first and second access protocols having a lowest average response time across its associated paths for at least one previous one of the monitoring intervals. Again, other types of performance measures, or various combinations of multiple such performance measures, can be used to inform the selection between access protocols as part of the performance-driven access protocol switching disclosed herein.

In conjunction with switching the logical storage device from utilization of the first access protocol to utilization of the second access protocol or vice versa, at least one of the MPIO drivers 112 of at least one of the host devices 102 is configured to temporarily pause sending of IO operations to the logical storage device, to allow one or more IO operations previously sent to the logical storage device to complete, to switch the logical storage device between access protocols, and responsive to completion of the switch between access protocols, to resume sending of IO operations to the logical storage device.

In some embodiments, the above-noted switching between access protocols, responsive to detected performance conditions currently impacting one of the access protocols, utilizes automated seamless migration of a logical storage device from one access protocol to another, and vice versa.

For example, some automated seamless migration arrangements used herein illustratively involve storing different versions of one or more host device operating system (OS) data structures in order to facilitate the seamless migration across the multiple access protocols. These arrangements illustratively utilize a multi-path layer of one or more of the host devices 102 in performing the migration across the multiple access protocols, in a manner that ensures that the logical storage device appears to a given host device OS as a single logical storage device. The multi-path layer in an arrangement of this type can store a first version of a host OS data structure comprising a first identifier of a logical storage device associated with a first access protocol, and in conjunction with migration of the logical storage device from utilization of the first access protocol to utilization of a second access protocol different than the first access protocol, to temporarily continue to present information from the first version of the OS data structure in response to one or more requests relating to the logical storage device, to obtain a second identifier of the logical storage device associated with the second access protocol, to store a second version of the host OS data structure comprising the second identifier of the logical storage device associated with the second access protocol, and to switch from presenting information from the first version of the host OS data structure to presenting information from the second version of the host OS data structure. The switch in presenting information is illustratively timed to ensure that the logical storage device appears to the host OS as the same device both before and after the migration from the first access protocol to the second access protocol.

In some embodiments, the multi-path layer receives an access protocol change notification, which initiates the process of automated seamless migration of the logical storage device from the first access protocol to the second access protocol. For example, responsive to receipt of the access protocol change notification, the multi-path layer is illustratively configured to store the first version of the host OS data structure comprising the first identifier of the logical storage device associated with the first access protocol.

The access protocol change notification in some embodiments comprises a check condition notification received from one of the storage arrays 105 that includes the logical storage device, and/or at least one command entered by an administrator or other user via a command line interface (CLI) or other user interface of at least one of the host devices 102.

In some embodiments, the MPIO driver 112-1 of the first host device 102-1 is configured to store the first and second versions of the host OS data structure and to control the migration of the logical storage device from utilization of the first access protocol to utilization of the second access protocol, although other arrangements of MPIO layer or host device components can perform these and other related operations in other embodiments.

The MPIO driver 112-1 can obtain the first identifier of the logical storage device associated with the first access protocol by sending a designated command in the first access protocol to the storage array 105-1 and receiving the first identifier from the storage array 105-1 in response to the designated command in the first access protocol.

Similarly, the MPIO driver 112-1 can obtain the second identifier of the logical storage device associated with the second access protocol by sending a designated command in the second access protocol to the storage array 105-1 and receiving the second identifier from the storage array 105-1 in response to the designated command in the second access protocol.

These or other similar operations can additionally or alternatively be performed by interaction between the MPIO driver 112-1 and the second storage array 105-2, interaction between the MPIO driver 112-2 and the second storage array 105-2, and/or interaction between the MPIO driver 112-2 and the first storage array 105-1.

In some embodiments, the first version of the host OS data structure comprises a virtual machine file system (VMFS) header or other type of VMFS data structure that includes the first identifier of the logical storage device and the second version of the host OS data structure comprises the VMFS header or other VMFS data structure updated to replace the first identifier of the logical storage device with the second identifier of the logical storage device. A wide variety of additional or alternative types of host OS data structures can be used in other embodiments. The term "host OS data structure" as used herein is therefore intended to be broadly construed, so as to encompass numerous different types of data structures that are utilized by a host device in conjunction with accessing a given logical storage device and that incorporate an identifier of the logical storage device.

In some embodiments, in conjunction with the migration of the logical storage device from utilization of the first access protocol to utilization of the second access protocol, one or more applications that utilize the logical storage device are temporarily moved from the first host device 102-1 to the second host device 102-2, where both host devices 102 are configured to access the logical storage device. The access protocol for the logical storage device is then changed from the first access protocol to the second access protocol on the second host device 102-2, and the one or more applications are subsequently moved back from the second host device 102-2 to the first host device 102-1. This is illustratively achieved by using vMotion functionality of an ESXi environment to non-disruptively migrate one or more virtual machines that execute the one or more applications from the first host device 102-1 to the second host device 102-2, and subsequently back from the second host device 102-2 to the first host device 102-1. In accordance with the vMotion functionality, the one or more applications can continue to execute while being migrated between ESXi servers. Other application movement techniques can be used in other types of host environments.

In some embodiments, in conjunction with the temporary move of the one or more applications from the first host device 102-1 to the second host device 102-2, a masking of the logical storage device to the first host device 102-1 is modified from a first masking utilizing the first access protocol to a second masking utilizing the second access protocol.

The switch in presenting information from the first version of the host OS data structure to presenting information from the second version of the host OS data structure is illustratively timed to occur in some embodiments subsequent to completion of the modification in the masking of the logical storage device to the first host device 102-1 from the first masking utilizing the first access protocol to the second masking utilizing the second access protocol, although other timing arrangements can be used in other embodiments in order to ensure that the host OS on the first host device 102-1 substantially continuously sees the logical storage device as the same logical storage device throughout the migration of that device from utilization of the first access protocol to utilization of the second access protocol.

Also, in conjunction with the subsequent move of the one or more applications back from the second host device 102-2 to the first host device 102-1, a masking of the logical storage device to the second host device 102-2 is modified from a first masking utilizing the first access protocol to a second masking utilizing the second access protocol.

Both of the host devices 102-1 and 102-2 can thereby illustratively access the logical storage device using the second access protocol. Migration back from use of the second access protocol to use of the first access protocol can also be achieved, using operations similar to those described above.

In some embodiments, the MPIO driver 112-1 utilizes its different stored versions of the host OS data structure to maintain multiple device identities for the logical storage device, while presenting a corresponding pseudo device or other type of composite device having a single device identity to one or more upper layers of the host device 102-1.

The above-described features of illustrative embodiments are examples of what is more generally referred to herein as "automated seamless migration" of logical storage devices. Illustrative embodiments are "automated" in that no coordination between a host administrator and a storage administrator is required, and are also "seamless" in that each host device seamlessly transitions from usage of the first access protocol to usage of the second access protocol to access the logical storage device, and vice versa, illustratively without disrupting the operation of applications that utilize that logical storage device. Other advantages are provided by other automated seamless migration arrangements in other embodiments.

Additional details regarding other examples of automated seamless migration techniques that may be used in illustrative embodiments herein are disclosed in U.S. patent application Ser. No. 17/106,788, filed Nov. 30, 2020 and entitled "Automated Seamless Migration across Access Protocols for a Logical Storage Device," and U.S. patent application Ser. No. 16/797,671, filed Feb. 21, 2020 and entitled "Host Device with Efficient Automated Seamless Migration of Logical Storage Devices across Multiple Access Protocols," each incorporated by reference herein in its entirety.

Such automated seamless migration techniques are not required, however, and other types of switching between access protocols for one or more logical storage devices can be used in other embodiments.

It should be noted that references in the above description and elsewhere herein to migration of single logical storage devices across multiple access protocols are non-limiting, and other embodiments can simultaneously migrate multiple logical storage devices across access protocols, through straightforward modification of the techniques disclosed herein, as will be readily apparent to those skilled in the art.

Such embodiments advantageously provide enhanced system performance by dynamically switching between SCSI-FC and NVMeF access protocols, and vice versa, or between other arrangements of multiple access protocols, for each of one or more logical storage devices of the system 100. For example, some existing HBAs support both multiple access protocols, such as SCSI-FC and NVMeF modes, so in systems with such HBAs there is no need to change hardware in order to migrate logical storage devices between the two different access protocols. However, as indicated previously, conventional techniques in these and other contexts generally do not permit host devices to dynamically switch a logical storage device between multiple access protocols based at least in part on congestion, errors and/or other performance conditions currently impacting one of the access protocols.

The above-described functions associated with performance-driven access protocol switching functionality of the host device 102-1 are illustratively carried out at least in part utilizing the MPIO driver 112-1 and its path selection logic 114-1. For example, in some embodiments, the seamless migration functionality can be implemented substantially entirely under the control of the MPIO driver 112-1, and in such embodiments the path selection logic 114-1 is illustratively configured to control performance of one or more steps of the flow diagram to be described below in conjunction with FIG. 2.

Figure 2:
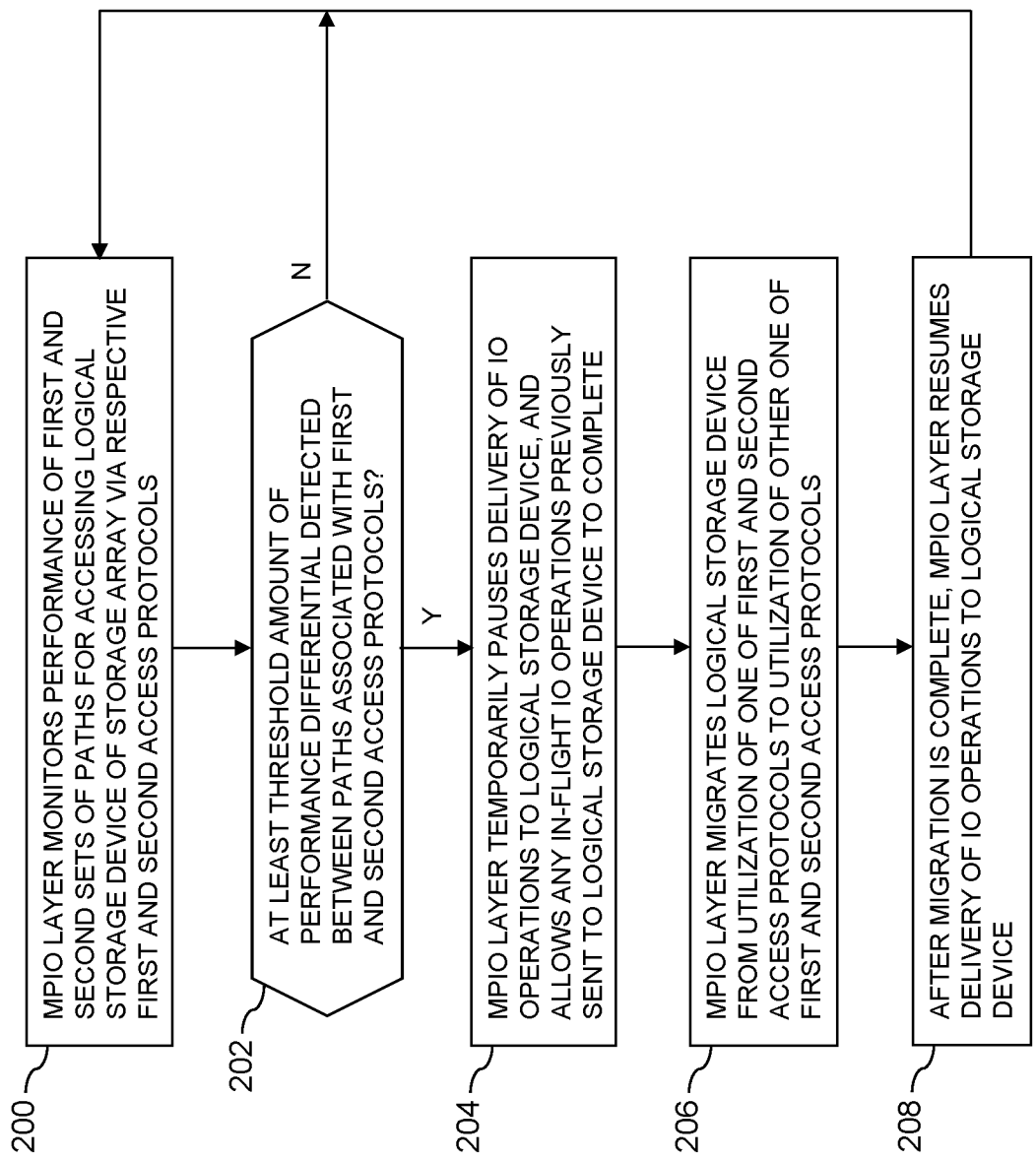
FIG. 2 is a flow diagram of a process for performance-driven access protocol switching utilizing a multi-path layer of a host device in an illustrative embodiment.

Additional or alternative host device components, such as migration control logic implemented in the host device, can be used to control performance of a performance-driven access protocol switching process such as that of FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed performance-driven access protocol switching functionality. Accordingly, aspects of performance-driven access protocol switching functionality described above in the context of the first MPIO driver 112-1 and the first host device 102-1 are assumed to be similarly performed by the other MPIO driver 112-2 and the other host device 102-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support performance-driven access protocol switching.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of migration control logic implemented in the host devices 102 and the storage arrays 105 can be used to perform at least portions of the performance-driven access protocol switching functionality.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising one or more host devices and at least one storage system. The one or more host devices are illustratively the first and second host devices 102-1 and 102-2 of FIG. 1, and the storage system illustratively comprises one or both of the storage arrays 105, with each such storage array comprising a plurality of storage devices. The storage devices of each such storage array are assumed to include logical storage devices such as LUNs or other logical storage volumes.

The steps of the FIG. 2 process are illustratively performed primarily by or under the control of an MPIO layer comprising one or more MPIO drivers of respective host devices, such as the MPIO drivers 112-1 and 112-2 of the first and second host devices 102-1 and 102-2 of system 100, although other arrangements of system components can perform at least portions of one or more of the steps in other embodiments. At least portions of the functionality of the FIG. 2 process may be performed at least in part in conjunction with a load balancing algorithm or other type of path selection algorithm executed by instances of path selection logic 114 of one or more MPIO drivers 112. A given host device is referred to as simply a "host" in the FIG. 2 process and elsewhere herein.

In step 200, the MPIO layer monitors performance of first and second sets of paths for accessing a logical storage device of a storage array via respective first and second access protocols. For example, assume one or more hosts are each configured to access a logical storage device using a first access protocol, illustratively a SCSI access protocol. The FIG. 2 process illustratively involves migration of the logical storage device from utilization of the SCSI access protocol to utilization of another access protocol, illustratively an NVMe access protocol, and vice versa, based at least in part on results of the path performance monitoring, although it is to be appreciated that other types of access protocols can be used. The SCSI and NVMe protocols utilized in the present embodiment are examples of what are more generally referred to herein as "first and second access protocols." The SCSI and NVMe protocols may more particularly comprise SCSI-FC and NVMeF access protocols, respectively, although numerous other types of first and second access protocols can be used in other embodiments. The logical storage device illustratively comprises a LUN or other type of logical storage volume implemented using storage devices of one or more of the storage arrays 105.

In step 202, a determination is made as to whether or not at least a threshold amount of performance differential is detected between paths associated with the first and second access protocols. For example, the threshold amount of performance differential may be a specified percentage higher or lower response time in one or more paths associated with the first access protocol relative to response time in one or more paths associated with the second access protocol. Under such a detected condition, one of the access protocols has a relatively high performance and the other access protocol has a relatively low performance. If at least the threshold amount of performance differential is detected, the process moves to step 204, and otherwise returns to step 200 as indicated.

Multiple performance measures may be used in determining whether or not at least a threshold differential exists between paths associated with the first and second protocols in step 202. For example, different paths associated with different access protocols may have similar response time measures, but host queue length may exhibit more than a threshold differential between the different paths. In such arrangements, determining whether at least a threshold differential exists can include comparing first performance measures for different paths associated with different access protocols, and if the threshold differential is not detected using the first performance measures, one or more additional comparisons may be sequentially implemented using respective additional performance measures, such as host queue length, storage array port congestion, and many others.

In step 204, the MPIO layer temporarily pauses delivery of IO operations to the logical storage device, and allows any in-flight IO operations previously sent to the logical storage device to complete.

In step 206, the MPIO layer migrates the logical storage device from utilization of one of the first and second access protocols to utilization of the other one of the first and second access protocols. As indicated elsewhere herein, such migration can utilize any of a number of different migration techniques.

For example, the migration is illustratively implemented using a process in which one or more hosts previously accessing the logical storage device via a particular one of the access protocols are reconfigured to access the logical storage device via the other one of the access protocols. In some arrangements of this type, it is assumed that the host OS is unable to access the logical storage device using the first and second access protocols simultaneously, and can instead only access the logical storage device using one of the access protocols at any given time. Accordingly, some embodiments herein configure an MPIO layer to determine, for example, that one or more paths associated with one of the access protocols are currently performing significantly better than one or more other paths associated with the other one of the access protocols, and responsive to such a determination, to migrate at least one host from its currently used access protocol for the logical storage device to the other access protocol. Such dynamic switching between access protocols illustratively leverages the MPIO layer to provide performance-driven migration of hosts between utilization of different access protocols for one or more logical storage devices.

In step 208, after migration is complete, the MPIO layer resumes delivery of IO operations to the logical storage device.

In some embodiments, automated seamless migration may be performed, such that the pausing and resuming in steps 204 and 208 are not needed. For example, in the context of ESXi servers, automated seamless migration may involve temporarily moving one or more applications using the logical storage device on the first host to the second host. More particularly, in some embodiments, the first and second hosts are each configured to access the logical storage device using the first access protocol. The MPIO layer receives an access protocol change notification and stores a first version of a host OS data structure including a first device ID, and temporarily continues to present information from the first version of the OS data structure in response to requests. One or more applications using the logical storage device on the first host are temporarily moved from the first host to the second host.

In some arrangements of this type, vMotion functionality of virtualization software of the first and second hosts is utilized to perform live migration of one or more virtual machines that execute the one or more applications from the first host to the second host. As noted above, the first and second hosts in such an embodiment illustratively comprise respective ESXi servers, although other types of hosts and application migration techniques can be used in other embodiments.

In conjunction with the movement of the one or more applications, the MPIO layer changes the masking of the logical storage device on the first host from the first access protocol to the second access protocol, obtains a second device ID for the logical storage device in the second access protocol, and stores a second version of the host OS data structure including the second device ID. The MPIO layer then switches from use of the first version of the host OS data structure to use of the second version of the host OS data structure on the first host, and the one or more applications using the logical storage device are moved back from the second host to the first host. The MPIO layer then changes the masking of the logical storage device on the second host and switches from use of the first version of the host OS data structure to use of the second version of the host OS data structure on the second host.

At this point, both the first and second hosts are each configured to access the logical storage device using the second access protocol. Subsequent migration of the logical storage device from the second access protocol back to the first access protocol can be achieved if needed, in a similar manner.

As indicated previously, additional details regarding other examples of automated seamless migration techniques that may be used in illustrative embodiments herein are disclosed in the above-cited U.S. patent application Ser. Nos. 17/106,788 and 16/797,671.

Again, numerous other types of migration can be used in other embodiments to migrate a logical storage device from use of one access protocol to another, and vice versa.

The steps of the FIG. 2 process are shown in sequential order for clarity and simplicity of illustration only, and certain steps can at least partially overlap with other steps. Also, one or more of the steps referred to as being performed by a particular system component, such as an MPIO layer comprising one or more MPIO drivers, can in other embodiments be performed at least in part by one or more other system components.

As indicated above, different instances of the FIG. 2 process can execute at least in part in parallel with one another for different logical storage devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and performance-driven access protocol switching functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different performance-driven access protocol switching arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
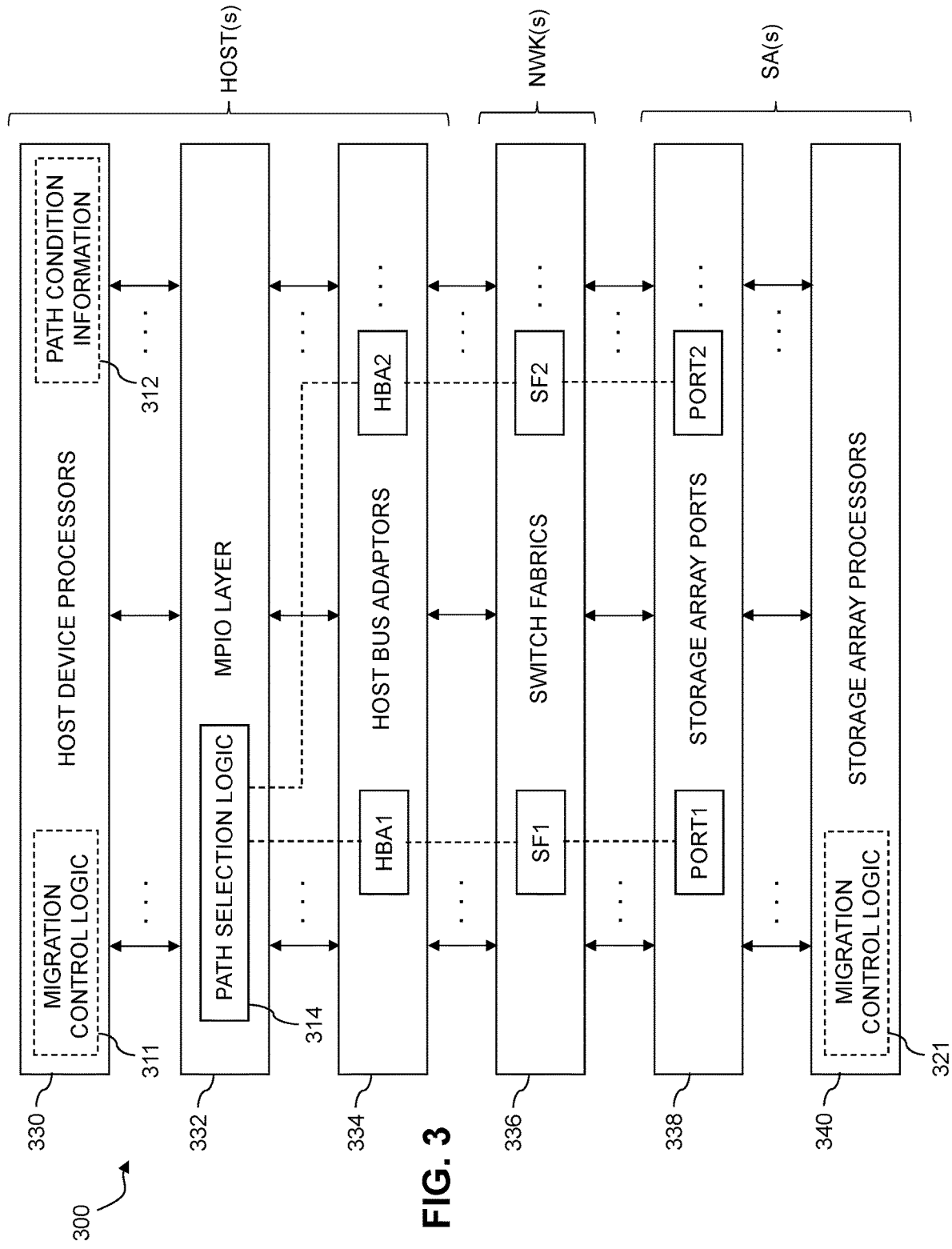
FIG. 3 is a block diagram showing multiple layers of a layered system architecture that includes a multi-path layer with performance-driven access protocol switching functionality in an illustrative embodiment.

Referring now to FIG. 3, another illustrative embodiment is shown. In this embodiment, an information processing system 300 comprises host-side migration control logic 311, path condition information 312, path selection logic 314 and storage-side migration control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements performance-driven access protocol switching for each of one or more logical storage volumes or other logical storage devices of one or more storage arrays. The logical storage devices store data for one or more application processes running in one or more host device processors of the host device processor layer 330. The performance-driven access protocol switching functionality in this embodiment is assumed to be controlled at least in part by host-side migration control logic 311, path selection logic 314 of the MPIO layer 332, and storage-side migration control logic 321, although other arrangements are possible.

The host-side migration control logic 311 implemented in the host processor layer 330 controls host-based migration processes of the system 300. The migration control logic 311 can include multiple distinct migration control logic instances for respective ones of a plurality of host devices of the system 300.

The storage-side migration control logic 321 implemented in the storage array processor layer 340 controls storage-based migration processes of the system 300. The migration control logic 321 can include multiple distinct migration control logic instances for respective ones of a plurality of storage arrays of the system 300.

The host-side and storage-side migration control logic 311 and 321 are illustratively configured to implement at least portions of the functionality for performance-driven access protocol switching as disclosed herein. These components are shown in dashed outline in the figure, as they can be implemented in different locations within the system 300, or in a distributed manner across multiple locations. For example, the host-side migration control logic 311, although illustratively shown as part of the host processor layer 330, can be implemented at least in part in the MPIO layer 332. As another example, the storage-side migration control logic 321, although illustratively shown as part of the storage array processor layer 340, can be implemented at least in part in the storage array port layer 338.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of JO operations to the storage arrays of system 300 as previously described. The path selection logic 314 in some embodiments operates in conjunction with the host-side and storage-side migration control logic 311 and 321 in implementing at least portions of the functionality for performance-driven access protocol switching as disclosed herein. Additional or alternative layers and path selection logic arrangements can be used in other embodiments.

In the system 300, path selection logic 314 is configured to select different paths for sending JO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In some embodiments, the host devices and storage arrays of system 300 through their respective instances of migration control logic 311 or 321 provide functionality for automated seamless migration across multiple access protocols as described elsewhere herein, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides the disclosed functionality for performance-driven access protocol switching, utilizing a corresponding instance of path selection logic implemented in the MPIO driver, possibly with involvement of one or more other host device components.

Figure 4:
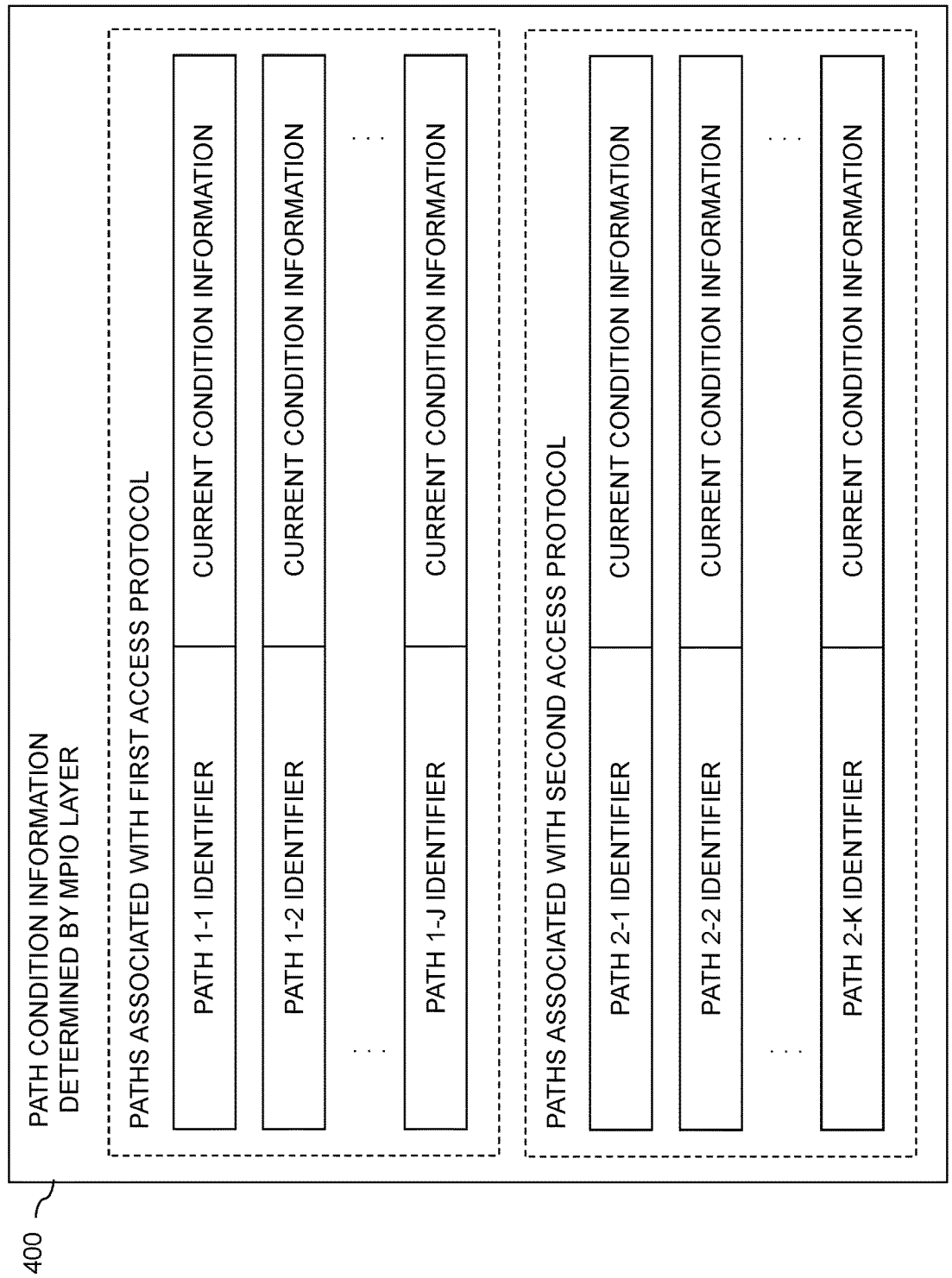
FIG. 4 shows an example of per-path performance information maintained by a multi-path layer of a host device for use in providing performance-driven access protocol switching in an illustrative embodiment.

FIG. 4 shows an example of path condition information 400 determined by an MPIO layer of a host device in an illustrative embodiment. The path condition information 400 in this embodiment is maintained in the form of a table, although other types of data structures can be used in other embodiments. Such information is illustratively determined by the MPIO layer of the host device periodically sending commands over respective paths and measuring the corresponding response times. The commands can be part of one or more IO operations, or separate from the IO operations. The resulting response time measurements are examples of what are also referred to herein as "latency measures" although other types of latency measures, or more generally "performance measures," can be used. For example, some embodiments compute average response times for each path using multiple commands sent over that path.

In the context of the FIG. 1 embodiment, the path condition information 400 is illustratively obtained by a given one of the MPIO drivers 112 of one of the host devices 102 through interaction with at least one of the storage arrays 105, and stored by the given MPIO driver in one or more tables or other data structures in at least one memory associated with one or more of the processors of the one or more host devices 102.

In the context of the FIG. 3 embodiment, the path condition information 400 corresponds to at least a portion of the path condition information 312, and is illustratively obtained by an MPIO layer 332 through interaction with the storage array layers 338 and 340, and stored in one or more tables or other data structures in a memory associated with one or more of the processors of host device processors layer 330.

The path condition information 400 more particularly comprises a plurality of entries for different ones of the paths to at least one storage array, with each such entry comprising a path identifier and current condition information for that path. Different ones of the paths are associated with different ones of first and second access protocols, such as respective SCSI-FC and NVMeF access protocols.

The paths associated with the first access protocol are denoted in the figure as Path 1-1, Path 1-2, . . . Path 1-J, and have their respective identifiers entered in a first column of the table of FIG. 4. Similarly, the paths associated with the second access protocol are denoted in the figure as Path 2-1, Path 2-2, . . . Path 2-K, and also have their respective identifiers entered in the first column of the table of FIG. 4. The second column of the table includes the current condition information for the corresponding paths identified in the first column, and illustratively comprises per-path latency measures of the type described above. Numerous other types and arrangements of entries and fields can be used, and the term "path condition information" as used herein is therefore intended to be broadly construed. Such information can be stored in one or more data structures of a multi-path layer of the host device and/or in other data structures elsewhere in the host device. For example, different data structures may be used for different paths sets associated with different access protocols.

Another additional embodiment implements a process that is illustratively performed by an MPIO layer, possibly in cooperation with other host device components. Such an embodiment can be configured, for example, to monitor performance of respective ones of a plurality of paths for accessing a logical storage device, and responsive to detection of at least one specified condition in the monitored performance relating to at least a subset of the paths, to switch the logical storage device from utilization of one access protocol to utilization of another access protocol.

The MPIO driver of a given host device in this embodiment is configured to determine IO processing performance for each of a plurality of paths by recording IO latency for each path at a desired granularity and monitoring corresponding IO statistics for each path. For example, IO statistics such as average response time can be computed and monitored for each path using multiple instances of measured response times for that path. This illustratively involves collecting response time samples on defined intervals for each path and computing and monitoring the corresponding IO statistics. An example of such an interval, which is also referred to herein as a monitoring interval, may be on the order of 1 second, although other types and arrangements of monitoring intervals can be used depending upon the particular needs and other characteristics of a given implementation.

Another example of a process for performance-driven access protocol switching implemented at least in part utilizing an MPIO layer, such as an MPIO layer comprising MPIO drivers 112 of the FIG. 1 embodiment or MPIO layer 332 of the FIG. 3 embodiment, will now be described in more detail.

The process in the present example more particularly comprises an algorithm performed by at least one host device interacting with at least one storage array, with the one or more host devices illustratively utilizing their respective MPIO drivers to perform at least portions of the algorithm.

In this example algorithm, an MPIO driver of multipathing software of a multi-path layer of one or more host devices is configured to swap between multiple available storage access protocols, for example, based on congestion, errors and/or other performance conditions impacting a particular one of the storage access protocols. In some embodiments, this involves the MPIO driver monitoring response time or other performance metrics indicative of congestion, errors and/or other performance conditions impacting IO operations delivered to a storage array using a particular one of the storage access protocols, and responsive to detection of such a condition, swapping from the impacted storage access protocol to another storage access protocol. Such "swapping" between access protocols is an example of what is more generally referred to herein as "switching" between first and second access protocols, and in some embodiments involves automated seamless migration of at least one logical storage device between the multiple access protocols.

The example algorithm for implementing performance-driven access protocol switching includes the following steps:

1. The MPIO driver on a host device tests, for each of a plurality of paths between initiators (e.g., HBAs of the host device) and targets (e.g., storage array ports) for a given logical storage device, the response time of each access protocol for that logical storage device. For example, different sets of paths illustratively use different access protocols, and one or more such paths are tested for each of the access protocols.

2. The MPIO driver selects for use with the logical storage device the particular access protocol having the minimum average response time across its paths.

3. The testing of Step 1 and the selection of Step 2 are illustratively repeated once every X seconds, or at other suitable time intervals, in order to dynamically improve the response time performance of the storage device over time by performance-driven swapping between access protocols that are utilized to access that logical storage device. For example, in some embodiments, the variable X can take on a value such as 100, 10, 1, 0.1, 0.01, etc. and is illustratively considered a tunable parameter that can be established by an administrator or other user.

4. If the average response time measured for an access protocol that is not currently being utilized to send IO operations to the storage device is not lower than that of the currently utilized access protocol by at least Y %, then the MPIO driver will not swap the protocols. This provides hysteresis to prevent the MPIO driver from swapping between access protocols too frequently for only limited benefit. The variable Y can take on a value such as 20%, indicating that a performance differential of at least 20% between the access protocols is needed in order to trigger the swapping of access protocols. Like the variable X above, the variable Y can take on other values and is illustratively considered a tunable parameter.

5. In swapping from a currently utilized access protocol to another access protocol that exhibits at least the above-noted Y % improvement in average response time, the MPIO driver will pause or "freeze" any new IOs to the logical storage device and drain any existing IOs (e.g., allow pending IOs to finish). The MPIO driver will then swap to the other access protocol, and resume or "thaw" new IOs to the logical storage device.

6. Additional or alternative criteria relating to congestion, errors and/or other performance conditions can be monitored by the MPIO driver and utilized to control swapping between the access protocols in Steps 1 and 2. For example, the protocol swap of Step 2 may occur if at least Z % of the paths to the logical storage device using one or the access protocols become non-responsive, "flaky" or exhibit other performance issues. In some embodiments, the swap of access protocols is triggered if at least 50% of the paths associated with one of the access protocols (e.g., at least 4 paths in a path set of 8 paths) are experiencing performance issues. Like the variables X and Y above, the variable Z can also take on other values and is illustratively considered a tunable parameter.

7. Similar swapping criteria can be monitored based on other types of errors, as well as switch-reported performance issues, possibly detected by the MPIO driver using fabric performance impact notifications (FPINs) received from the switch fabric connecting the host device with the storage array.

This particular algorithm is presented by way of illustrative example only, and other embodiments can use other types of algorithms to provide the disclosed functionality for performance-driven access protocol switching.

The term "swap" in the context of swapping of access protocols as disclosed herein illustratively has a different technical implementation for different types of host environments. For example, in an ESXi environment, as described previously, the term "swap" illustratively includes vMotion activity between different hosts, each using a different access protocol. For physical environments, such as Linux for example, the term "swap" illustratively includes switching between different path-sets where each path-set uses a different access protocol. These and other swapping arrangements disclosed herein are only examples, and other embodiments can utilize other migration techniques or more generally other types of switching between access protocols.

Illustrative embodiments herein provide significant advantages over conventional arrangements in which a host OS is configured to operate with a particular storage access protocol and cannot swap from a current access protocol to another access protocol if the current access protocol is experiencing congestion, errors and/or other performance conditions.

The MPIO driver portions of the above algorithm may be similarly performed by other MPIO drivers on respective other host devices. Such MPIO drivers illustratively form a multi-path layer comprising multi-pathing software of the host devices.

Also, ESXi, Linux and other host environments are used herein as non-limiting examples only, and the same or similar performance-driven access protocol switching techniques can be used in a wide variety of other host device environments.

Again, the above algorithm is presented by way of illustrative example only, and other embodiments can utilize additional or alternative steps. Also certain steps illustrated as being performed serially can instead be performed at least in part in parallel with one another.

Advantageously, illustrative embodiments can non-disruptively transform a storage access protocol for a logical storage device from SCSI to NVMe and vice versa based at least in part on detected performance conditions currently impacting a particular one of the access protocols.

Additionally or alternatively, some embodiments provide a storage multi-pathing driver supporting more than one storage access protocol for a single managed device.

The particular performance-driven access protocol switching arrangements described above are presented by way of illustrative example only. Numerous alternative arrangements of these and other features can be used in implementing performance-driven access protocol switching in other embodiments.

It is apparent from the foregoing that the illustrative embodiments disclosed herein can provide a number of significant advantages relative to conventional arrangements. For example, some embodiments configure host devices comprising respective MPIO drivers to include functionality for performance-driven access protocol switching for logical storage volumes or other types of logical storage devices.

The disclosed functionality can be implemented using a wide variety of different host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, migration control logic and additional or alternative components. Also, the particular configurations of system and device elements and associated processing operations illustratively shown in the drawings can be varied in other embodiments. For example, a wide variety of different host device, MPIO driver and storage system configurations and associated performance-driven access protocol switching arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to monitor performance of respective ones of a plurality of paths for accessing a logical storage device; and
   responsive to detection of at least one specified condition in the monitored performance relating to at least a subset of the paths, to switch the logical storage device from utilization of a first access protocol to utilization of a second access protocol different than the first access protocol;
   wherein monitoring performance of respective ones of the plurality of paths for accessing the logical storage device comprises monitoring at least a first path for accessing the logical storage device utilizing the first access protocol and monitoring at least a second path different than the first path for accessing that same logical storage device utilizing the second access protocol, and further wherein switching the logical storage device from utilization of the first access protocol to utilization of the second access protocol comprises switching from utilizing the first path to access the logical storage device to utilizing the second path to access the logical storage device;

wherein the first path is one of a first set of paths configured to utilize the first access protocol;

wherein the second path is one of a second set of paths, different than the first set of paths, configured to utilize the second access protocol; and wherein the configuration of the first set of paths to utilize the first access protocol and the configuration of the second set of paths to utilize the second access protocol occur at least in part concurrently with one another.

2. The apparatus of claim 1 wherein the first access protocol comprises a Small Computer System Interface (SCSI) access protocol and the second access protocol comprises a Non-Volatile Memory Express (NVMe) access protocol.

3. The apparatus of claim 2 wherein the SCSI access protocol comprises a SCSI over Fibre Channel (SCSI-FC) access protocol and the NVMe access protocol comprises an NVMe over Fabrics (NVMeF) access protocol.

4. The apparatus of claim 1 wherein said at least one processing device comprises at least a portion of at least one host device coupled to a storage system via at least one network.

5. The apparatus of claim 4 wherein the paths are associated with respective initiator-target pairs and wherein each of a plurality of initiators of the initiator-target pairs comprises a corresponding host bus adaptor of said at least one host device and each of a plurality of targets of the initiator-target pairs comprises a corresponding port of the storage system.

6. The apparatus of claim 4 wherein said at least one host device comprises a multi-path layer, the multi-path layer comprising at least one multi-path input-output driver configured to control delivery of input-output operations from said at least one host device to the storage system over selected paths through the network.

7. The apparatus of claim 1 wherein monitoring performance of respective ones of a plurality of paths for accessing a logical storage device comprises:
monitoring performance of a first set of paths associated with the first access protocol; and
monitoring performance of a second set of paths associated with the second access protocol.

8. The apparatus of claim 7 wherein monitoring performance of at least one of the first and second sets of paths comprises:
sending designated access protocol commands over corresponding ones of the paths;
measuring response time to the access protocol commands; and
repeating the sending and measuring in each of a plurality of monitoring intervals.

9. The apparatus of claim 7 wherein detecting at least one specified condition in the monitored performance relating to at least a subset of the paths comprises:
comparing at least one performance measure of the first set of paths associated with the first access protocol to at least one performance measure of the second set of paths associated with the second access protocol; and
detecting at least a threshold differential between the performance measures of the first and second sets of paths.

10. The apparatus of claim 1 wherein said at least one processing device is further configured to dynamically switch the logical storage device between utilization of the first and second access protocols over a plurality of access protocol switching instances responsive to detection of respective specified conditions in the monitored performance of paths associated with one of the access protocols relative to the monitored performance of paths associated with the other one of the access protocols.

11. The apparatus of claim 1 wherein said at least one processing device is further configured to monitor the performance of the paths over a plurality of monitoring intervals and for each of one or more of the monitoring intervals to select a particular one of the first and second access protocols for utilization by the logical storage device in that monitoring interval based at least in part on the monitored performance of the paths for at least one previous one of the monitoring intervals.

12. The apparatus of claim 11 wherein selecting a particular one of the first and second access protocols for utilization by the logical storage device in a given one of the monitoring intervals comprises selecting the particular one of the first and second access protocols having a lowest average response time across its associated paths for at least one previous one of the monitoring intervals.

13. The apparatus of claim 1 wherein said at least one processing device is further configured, in conjunction with switching the logical storage device from utilization of the first access protocol to utilization of the second access protocol or vice versa:
to temporarily pause sending of input-output operations to the logical storage device;
to allow one or more input-output operations previously sent to the logical storage device to complete;
to switch the logical storage device between access protocols; and
to resume sending of input-output operations to the logical storage device.

14. The apparatus of claim 1 wherein monitoring performance of respective ones of a plurality of paths for accessing a logical storage device comprises monitoring fabric performance impact notifications received from one or more switch fabrics.

15. A computer program product comprising a non-transitory processor-readable storage medium having stored therein program code of one or more software programs, wherein the program code, when executed by at least one processing device comprising a processor coupled to a memory and configured to communicate over a network with a storage system, causes said at least one processing device:
to monitor performance of respective ones of a plurality of paths for accessing a logical storage device; and
responsive to detection of at least one specified condition in the monitored performance relating to at least a subset of the paths, to switch the logical storage device from utilization of a first access protocol to utilization of a second access protocol different than the first access protocol;
wherein monitoring performance of respective ones of the plurality of paths for accessing the logical storage device comprises monitoring at least a first path for accessing the logical storage device utilizing the first access protocol and monitoring at least a second path different than the first path for accessing that same logical storage device utilizing the second access protocol, and further wherein switching the logical storage device from utilization of the first access protocol to utilization of the second access protocol comprises switching from utilizing the first path to access the logical storage device to utilizing the second path to access the logical storage device;

wherein the first path is one of a first set of paths configured to utilize the first access protocol;

wherein the second path is one of a second set of paths, different than the first set of paths, configured to utilize the second access protocol; and wherein the configuration of the first set of paths to utilize the first access protocol and the configuration of the second set of paths to utilize the second access protocol occur at least in part concurrently with one another.

16. The computer program product of claim 15 wherein monitoring performance of respective ones of a plurality of paths for accessing a logical storage device comprises:

monitoring performance of a first set of paths associated with the first access protocol; and monitoring performance of a second set of paths associated with the second access protocol.

17. The computer program product of claim 15 wherein detecting at least one specified condition in the monitored performance relating to at least a subset of the paths comprises:

comparing at least one performance measure of the first set of paths associated with the first access protocol to at least one performance measure of the second set of paths associated with the second access protocol; and detecting at least a threshold differential between the performance measures of the first and second sets of paths.

18. A method comprising:

monitoring performance of respective ones of a plurality of paths for accessing a logical storage device; and responsive to detection of at least one specified condition in the monitored performance relating to at least a subset of the paths, switching the logical storage device from utilization of a first access protocol to utilization of a second access protocol different than the first access protocol;

wherein monitoring performance of respective ones of the plurality of paths for accessing the logical storage device comprises monitoring at least a first path for accessing the logical storage device utilizing the first access protocol and monitoring at least a second path different than the first path for accessing that same logical storage device utilizing the second access protocol, and further wherein switching the logical storage device from utilization of the first access protocol to utilization of the second access protocol comprises switching from utilizing the first path to access the logical storage device to utilizing the second path to access the logical storage device;

wherein the first path is one of a first set of paths configured to utilize the first access protocol;

wherein the second path is one of a second set of paths, different than the first set of paths, configured to utilize the second access protocol;

wherein the configuration of the first set of paths to utilize the first access protocol and the configuration of the second set of paths to utilize the second access protocol occur at least in part concurrently with one another; and wherein the method is performed by at least one processing device comprising a processor coupled to a memory.

19. The method of claim 18 wherein monitoring performance of respective ones of a plurality of paths for accessing a logical storage device comprises:

monitoring performance of a first set of paths associated with the first access protocol; and monitoring performance of a second set of paths associated with the second access protocol.

20. The method of claim 18 wherein detecting at least one specified condition in the monitored performance relating to at least a subset of the paths comprises:

comparing at least one performance measure of the first set of paths associated with the first access protocol to at least one performance measure of the second set of paths associated with the second access protocol; and detecting at least a threshold differential between the performance measures of the first and second sets of paths.

21. The method of claim 18 wherein monitoring performance of respective ones of a plurality of paths for accessing a logical storage device comprises monitoring fabric performance impact notifications received from one or more switch fabrics.

* * * * *